G. W. BROWN.
Corn Planter.
No. 99,286.
Patented Feb. 1, 1870.
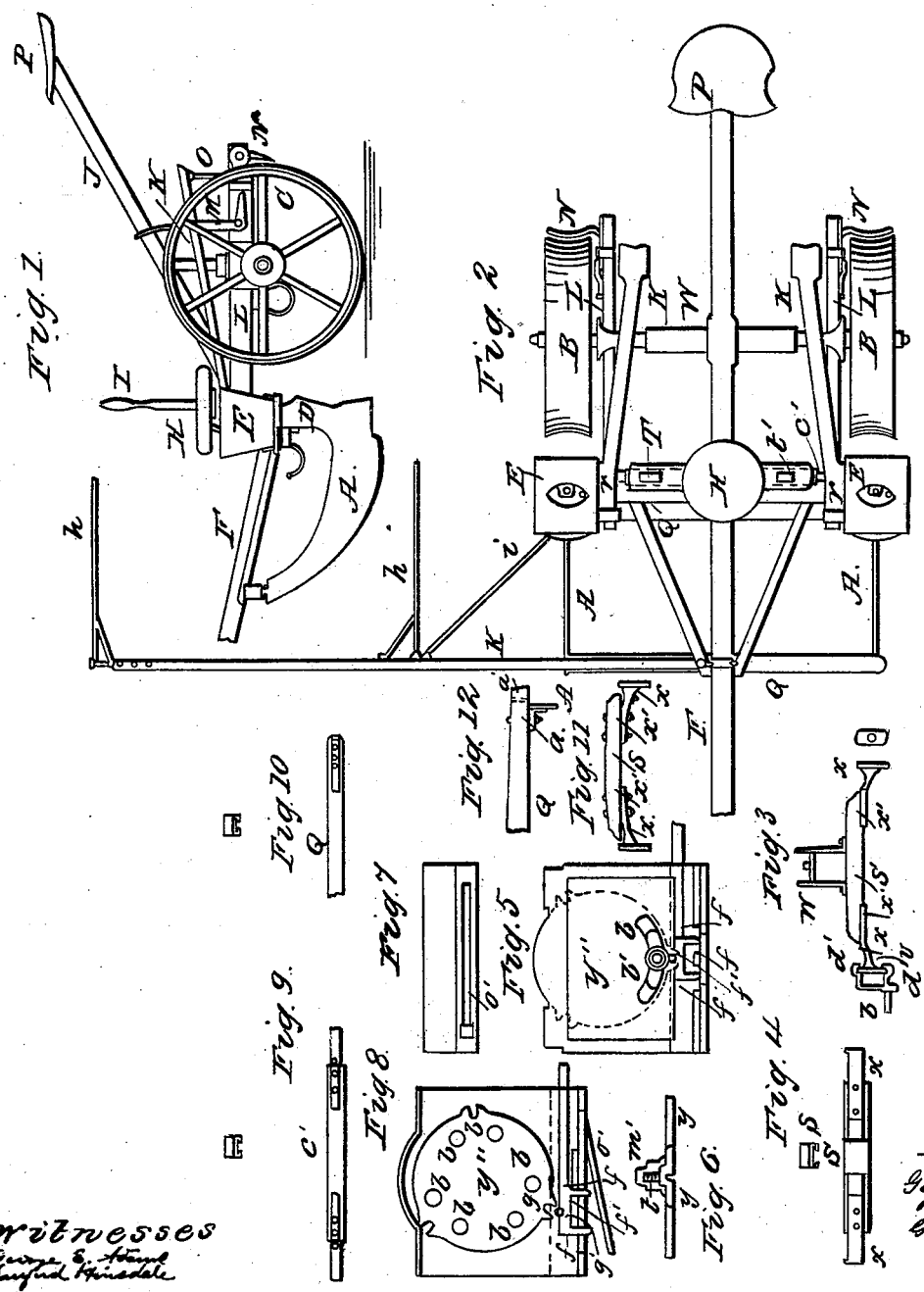

UNITED STATES PATENT OFFICE.

GEORGE W. BROWN, OF GALESBURG, ILLINOIS.

IMPROVED SEED-PLANTER.

Specification forming part of Letters Patent No. 99,286, dated February 1, 1870.

*To whom it may concern:*

Be it known that I, GEORGE W. BROWN, of Galesburg, in the county of Knox and State of Illinois, have invented a new and useful Improvement in Seed-Planters; and I do hereby declare that the following is a full, clear, and exact description of the construction and operation of the same, reference being had to the annexed drawings, making a part of this specification, in which—

Figure 1 is a side elevation of my improved seed-planter. Fig. 2 is a top view. Fig. 3 is a view of the axle, showing the method of adjusting it to a greater or lesser length; also, the form of the joint made in uniting it with the side pieces. Fig. 4 is another view of the axle, showing the method of adjusting to a greater or lesser length. Fig. 5 is a view of the interior of the seed-box. Fig. 6 is a view of a cross-section of the upper seed-plate, showing the yielding cut-off. Fig. 7 is a rear view of the lower portion of the seed-box. Fig. 8 is a top view of the lower seed-plate, located inside the seed-box, with the movable cross-bar C' detached. Fig. 9 illustrates the method of lengthening or shortening the movable cross-bar C'. Fig. 10 illustrates one method of lengthening or shortening the cross-bar Q. Fig. 11 illustrates another method of lengthening or shortening the axle-bar S; Fig. 12, another method of the same.

To enable others skilled in the art to make and use my invention, I will proceed to describe its construction and operation.

The object of my invention is to construct a seed-planter so that the attendant on the rear part of the machine can readily force the fore part of the machine into or out of the ground, or force either or both of the furrow-openers into or out of the ground, at pleasure, and one that will readily adjust itself to the inequalities of the surface of the ground as it is drawn over it, each runner and each of the wheels acting independently of the other, and that can be adjusted to a greater or lesser width, and also to provide a seed-planter with following-wheels having a concave periphery.

This invention is designed to be an improvement upon the various inventions of seed-planters which I have made heretofore, and for which I have several patents.

A, Fig. 1, is a runner, of which there are two, each located in front of one of the wheels. D is a hollow standard passing from the heel of the runner up to the seed-box. Through this tube the seed passes in its passage from the seed-box to the ground.

The wheels B B are constructed with a concave periphery. They are made of plate or heavy sheet iron; but I prefer to make them of heavy sheet-iron, as it makes the wheel lighter and stronger than when made of cast-iron or all of wood. This periphery or iron part of the wheel is made in one piece, being bent to its present peculiar shape by machinery. The peculiar shape of the periphery of the wheel makes it much stronger, and also more readily presses the soil upon the seed.

I use a small felly, C, in the wheel. It is made of bent or sawed wood.

F is the tongue, attached to the cross-bar Q, and, passing back, is attached to the cross-bar Q'. L L are side pieces extending from the seed-boxes to the rear of the wheels B B, and loosely attached to the seed-boxes E E at $r$ $r$, Fig. 2. H is a seat, upon which the operator manipulating the hand-lever I sits, and it is located midway between the seed-boxes E E. T is a fulcrum-bar attached to the seat H, with apertures $t'$ $t'$, through which the hand-lever I passes. C' is a cross-bar passing from the lower seed-plate, $y''$, of one seed-box to the seed-plate $y''$ of the other, and is operated by the hand-lever I. K K are foot-levers or treadles attached to the inner side of the seed-boxes and over the front end of the side pieces, L L, and extend back of the axle S, the rear end being somewhat higher than the front end.

$o$, Fig. 1, is a stirrup attached to the rear end of the levers K K. J is a seat-beam passing from a point under the seat H back over the rest W, and terminates with the seat P. M is a foot-lever attached to the rear end of the side piece, L. The same is found on the opposite side. This foot-lever M interlocks with a scraper-lever, N, which works upon the concave periphery of the wheels B B.

S S, Figs. 2 and 3, is the axle, terminating in the iron shanks $x$ $x$. The outer ends of these shanks fit in the clasps $d'$ $d'$, which surround the side piece, L. Within the clasp $d'$ $d'$ is a small pivot, $v$, attached to the side piece, L, which fits into a socket in shanks $x\,x$. The axle S is lengthened or shortened by the shanks $x\,x$, working in a recess in the part $s$, as shown more clearly at Fig. 4.

$y$, Fig. 6, is a cross-section of the upper seed-plate, located within the seed-box E. $y'$ is a yielding cut-off, made so by being pressed against by the coiled spring $t$, the coiled spring being placed within the cap $m'$.

A rubber spring could be used instead of the coiled spring. The cross-bar C' has two lugs, $f\,f$, Fig. 8. $f'$ is a pin placed between these lugs $f\,f$. $g'$ fits into the notch $g$ of the lower seed-plate, $y''$. $b\,b\,b$ are holes in the seed-plate $y''$, through which the seed passes.

$o'$, Figs. 7 and 8, is a door placed at the base of the rear side of the seed-boxes E E.

The operation of my machine is as follows: The team is attached to the tongue F, which draws the machine over the ground. The driver is mounted upon the seat P, and from that position drives the team and governs the machine. One foot is placed on the end of each of the levers K K, and by pressing with more or less weight upon one or the other or both of these levers the front part of the machine is pressed downward, or one or the other of the runners is depressed. Thus, no matter what the surface of the ground is, the machine conforms to it. This is accomplished in consequence of the peculiar method of attaching the different parts of the machine together.

All that part of the machine forward of the wheels is attached to the other part—i. e., the part embracing the wheels and axle—by a yielding or flexible joint operating at $r\,r$ upon the front ends of the side pieces, L L. Thus the front or runner part is enabled to be moved as a whole upward or downward, independent of the wheel part.

The peculiar method of attaching the shanks $x\,x$ to that part of the axle to which the wheels are attached, by means of the clasps $d'\,d'$, which surround the side pieces, L L, forming a joint, Fig. 3, enables the outer ends of these shanks $x\,x$ to turn in these clasps $d'\,d'$ upon the pivot $v$, and thus, as the operator presses down one or the other of the levers K K, one or the other of the runners is depressed.

This effect, I claim, can be produced by any joint or connection between the axle-bar S and side pieces, L L, that will allow the axle to oscillate when the machine is passing over the ground.

The stirrups $o$ are used to place the driver's feet in when the front part of the machine is raised.

The peripheries of the wheels B B are made concave. This peculiar shape of the periphery more readily covers the seed than when flat, as the seed is dropped in a crease or furrow made by the runner.

The peculiar construction of the machine also enables it to be widened or narrowed, to plant the rows at a greater or lesser distance apart. The shanks $x\,x$ are made to work in guides in the axle S, Figs. 3 and 4. The same peculiar construction is also shown in the bar C', Figs. 2 and 8, connecting the seed-plates $y\,y''$ of the seed-boxes E E. The ends of the bar work in guides, the same as in the axle S, Figs. 9 and 10.

Fig. 12 shows the same method of opening and widening the front end of the runners A.

The cross-bar Q does not operate in the same way. The ends do not upset, as in the other cross-bars; but the heels of the runners and seed-boxes are made to approach or recede from each other upon the cross-bar Q', as circumstances require. The shanks $x\,x$ are made to upset by means of nuts and bolts, as shown in Fig. 11.

The cut-off in the seed-boxes E E is made yielding, being pressed down by a coiled spring, $t$, and as the seed-plate $y''$ is vibrated by means of the cross-bar C', alternately bringing the holes $b\,b$ under the cut-off, carrying seed to be dropped, no seed can be injured, as the cut-off, being yielding, does not afford sufficient resistance between the cut-off and the seed-plate to injure the seed. The holes $b\,b$ in the seed-plate are made of different sizes, so as to admit of planting seed in greater or lesser charges. The holes are made in sets of two each, and as a greater or lesser charge is desired, so is the plate changed to admit the holes of the desired size to vibrate under the cut-off. This is done by opening the door $o'$ and relieving the pin $g'$ from the notch $g$, and by throwing back the cross-bar C', (see Fig. 8,) thus enabling the plate to be turned around to change from one-sized seed-cups to another, as may be desired.

It is desirable that a mark should be made six feet to one side of the machine, and when the machine returns, by driving the tongue of the machine over this mark, the machine will run the right distance from the row previously planted, so as to secure uniformity of width between the rows. This is accomplished by attaching a marker to the front part of the runners A.

A beam, K', Fig. 2, is attached to the cross-bar Q, and extends out as far as desired.

It is attached by one end having an eye, which unites with a hook at the tongue, and the brace $l'$, extending diagonally from one end of the cross-bar Q' to the beam K'. To this beam K' are loosely attached two drags or markers, $h\,h$. These are drawn over the ground, leaving a mark. This beam K' is changed to the other side when desired and fastened in the same way.

Having thus described my invention, what I claim as new, and desire to secure by Letters Patent, is—

1. The foot-levers K K, made and arranged substantially as shown and described, and for the purposes set forth.

2. Uniting the shanks $x\,x$ with the side pieces, L L, by means of a joint, $d'\,d'$, substantially as described and shown, and for the purposes set forth.

3. Combining the joints $d'\,d'$ on each end of the axle S with the yielding joint $r\ r$, which enables the machine to conform to an uneven surface, substantially as described, and for the purposes set forth.

4. The wheels B B, shanks $x\ x$, clasps $d'\ d'$, and axle S, all combined, arranged, and constructed substantially as shown and described.

5. The combination of the yielding jointed axle S, cross-bars $Q\ Q'$, and seed-boxes E E, all arranged and constructed to widen and narrow the planting of the seed-planter, substantially as shown and described.

6. Combining the door $o'$, or its equivalent, and cross-bar $C'$, for the purpose of disengaging the latter from the seed-plates $y\ y$, substantially as shown and described.

7. Attaching the marker $K'$ to the forward part of a seed-planting machine, substantially as described.

8. The yielding cut-off $y'$, when made and arranged to operate substantially in the manner shown and described.

GEO. W. BROWN.

Witnesses:
S. G. CUMMINGS,
LOREN STEVENS.